United States Patent [19]

Rowe et al.

[11] Patent Number: 4,782,579
[45] Date of Patent: Nov. 8, 1988

[54] METHOD OF ASSEMBLING A PRECURED RING CLAMP ASSEMBLY

[75] Inventors: Charles M. Rowe, Orlando; Hector O. Ponce, Winter Park; David H. Kistler, Deltona, all of Fla.

[73] Assignee: Westinghouse Electric Corp., Pittsburgh, Pa.

[21] Appl. No.: 116,090

[22] Filed: Nov. 3, 1987

[51] Int. Cl.$^4$ .............................................. H02K 15/14
[52] U.S. Cl. ...................................... 29/596; 310/42; 310/260
[58] Field of Search ................... 29/596; 310/260, 270, 310/42

[56] References Cited

U.S. PATENT DOCUMENTS

| Re. 28,478 | 7/1975 | Bahn et al. | 310/260 |
|---|---|---|---|
| 3,024,302 | 3/1962 | Coggeshall | 310/260 |
| 3,089,048 | 5/1963 | Bahn et al. | 310/260 |
| 3,344,296 | 9/1967 | Coggeshall et al. | 310/260 |
| 3,344,297 | 9/1967 | Bishop et al. | 310/260 |
| 3,348,085 | 10/1967 | Coggeshall et al. | 310/260 |
| 4,238,339 | 12/1980 | Khutoretsky et al. | 310/260 |
| 4,387,317 | 6/1983 | Alkire et al. | 29/596 |
| 4,563,607 | 1/1986 | Cooper et al. | 310/260 |

Primary Examiner—P. W. Echols
Attorney, Agent, or Firm—D. C. Abeles

[57] ABSTRACT

A mechanical clamping assembly and method for clamping coils at stator end windings of large steam turbine generators is provided for generators of the type which inhibit access to at least one side of coils to be clamped. The apparatus includes a precured radial band clamp having an anchor assembly which can be latched into position from radially inward of the generator. The method includes forming the precured band clamp in attachment to the anchor assembly, inserting the clamp and anchor assembly into position in the generator, inserting a pin into the clamp at its radially inward end, pulling on the pin to tension the clamp and inserting shims under the pin to maintain the tension.

6 Claims, 4 Drawing Sheets

METHOD OF ASSEMBLING A PRECURED RING CLAMP ASSEMBLY

This invention relates to electric power generators and, more particularly, to an improved support assembly for end windings in a generator stator.

BACKGROUND OF THE INVENTION

Large public utility power plants produce electricity by coupling a generator to a mechanical power source such as a steam turbine. The generator comprises a rotor journaled in a stator, the rotor containing copper coil windings which carry a direct current for producing a magnetic flux. The power source spins the rotor at high speeds, causing the magnetic flux to sweep across copper coil windings in the stator and generate an electric current.

The generator stator comprises a cylindrical core having longitudinal slots along an inner surface, each slot containing a pair of top and bottom half turn coils. The half turn coils emerge from the longitudinal slots at each end of the stator core and loop in order to connect with other half turn coils thus forming a coil winding. The portion of a half turn coil which emerges from a slot for this connection is commonly referred to as a coil end turn. The plurality of end turns at each end of a stator core form an end winding basket. This basket arrangement of individual end turns must be consolidated into a unified structure in order to restrain radial and tangential coil movements which result from large electromagnetic forces, thermal expansion and coil vibration. Support rings and nonconductive braces are bolted through brackets to the stator core to brace the end turns and reduce coil wear which results from coil movement.

Efforts to reduce movement in the coil end windings of electric generators have resulted in several improved end turn support assemblies. For example, U.S. Pat. No. 4,563,607, issued Jan. 7, 1986 to Cooper, et al. and assigned to the assignee of the present invention, discloses a radial clamp assembly for clamping pairs of parallel top stator coil end turns with pairs of parallel bottom stator coil end turns. In these clamping arrangements, radial bands couple the top and bottom coil pairs in order to minimize movement of the individual end turns relative to the entire end winding basket. A top fiber glass support block is placed across the upper sides of two adjacent parallel top coil end turns, and a bottom fiber glass support block is placed across the lower sides of two adjacent parallel bottom coil end turns, with each of the support blocks having a central aperture. The two apertures are aligned with one another through a diamond shaped slot formed between the top and bottom end turn pairs. A resin impregnated fiber glass band comprising a number of turns of a fiber glass tape is passed through one of the apertures, and extends through each of the support block apertures. A pin is inserted through the band protruding through each support block to hold the band in position. The band is twisted to take up most of the slack. The band is then cured.

The curing process increases band tension strength from approximately 5,000 pounds to over 15,000 pounds. Curing is also believed to minimize the effects of moisture on the fiberglass. When curing is completed a tension device, such as a hydraulic jack, is used to pull at least one pin on each clamp assembly away from an adjacent support block in order to stretch the cured bands. Shims are then placed between the pins and the adjacent upper or lower blocks to keep the bands stretched after the pins are released. Spring washers or spring plates may also be positioned between the pins and support blocks to control loss of tension due to creep relaxation in the bands.

Such radial clamp assemblies have been installed on machines in the field as well as during factory assembly. However, the necessary curing process normally requires approximately four hours of continuous heating at 170° C. In a typical installation having as many as 42 radial clamps per end winding basket, the bands must be individually cured by directing pairs of heat guns mounted on the top and bottom support blocks toward each band. Although several bands can be simultaneously cured, the installation process for forty two clamps may exceed twenty four hours. Precured bands have not been used in the past to reduce the installation time required for radial clamps because the cured bands cannot be twisted in place to remove excess slack. It is desirable to reduce the time required for band installation and in particular to develop a clamping configuration which allows for precuring of the glass fiber bands in order to expedite the installation process.

Recent improvements in stator end turn coil bracing systems include the positioning of a non-metallic segmented ring against the upper surfaces of the top coil end turns and the positioning of a non-metallic cone shaped support ring against the lower surfaces of the bottom coil end turns to provide a continuous rigid support about the end winding basket. These ring structures are used in lieu of top and bottom support blocks in some generators. The rings are formed of a semi-rigid baked fiber glass/epoxy resin composite. In order to provide sufficient mass and stiffness to reduce steady-state coil vibration and other sources of coil movement to acceptable levels, the structures must be relatively large. As a result there are very limited clearances about the end winding basket. Therefore, the aforedescribed process of installing uncured radial bands cannot be used to clamp the portions of coil end turns which are most subject to movement. It is therefore desirable to have an alternate band arrangement and method of clamp installation which provides for maximum radial clamping of top and bottom coils between the support ring structures of the type used in such generators.

SUMMARY OF THE INVENTION

Among the several objects of the present invention may be noted the provision of an improved clamping apparatus and method for clamping the ring support structure of a stator end winding.

It is an object of the present invention to provide a precured replaceable ring band and a method of installing the replaceable ring band in an improved clamping apparatus, the method being adapted for field replacement as well as factory installation of the ring band.

It is another object of the present invention to provide a method for clamping the end turn coils of an electric generator which reduces the time required for clamp installation.

It is a further object of the present invention to provide a precured band for clamping coil end turns along areas of limited clearance in the ring support structure of a generator without interfering with electrical connectors.

In one form, the present invention comprises a plurality of precured radial bands adapted for adjustable securement to the interior of an end winding support cone. The cone includes a plurality of threaded cylindrical bores or holes circumferentially spaced along the inner cone surface penetrating the cone in substantially a radial direction. Cylindrically shaped anchors adapted to be threaded into the bores are each coupled to one end of a precured band. The second end of each precured band is secured to a segmented ring positioned against the top coil end turns so that it can be tensioned in place.

DETAILED DESCRIPTION OF THE INVENTION

Figure 1:
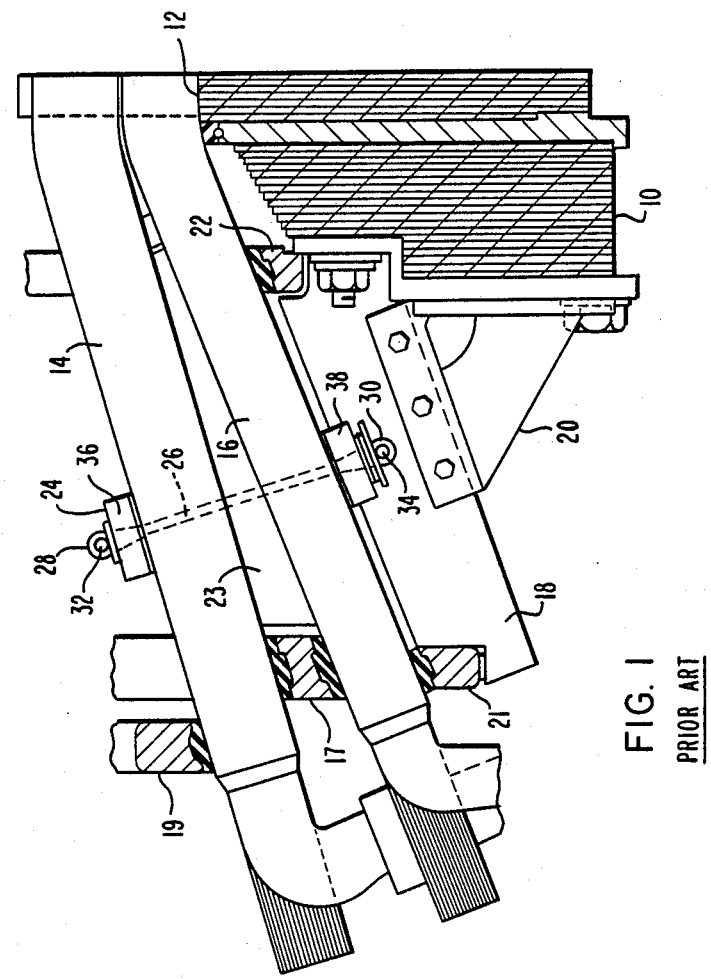
FIG. 1 illustrates a prior art radial clamp assembly for coil end turns of an electric generator stator.

FIG. 1 is a cross-section of a portion of an end turn assembly of a dynamo electric machine with a radial clamping device in accordance with the prior art as disclosed in U.S. Pat. No. 4,563,607 by Cooper et al assigned to the assignee of the present invention. It shows an end winding portion of a turbine generator and includes a stator iron core 10 with slots 12 containing coils that include a top coil 14 and a bottom coil 16, referring respectively to the top and bottom of the slots, which extend beyond the core 10 into an end turn region of the machine. It should be noted that in the cross sectional view in FIG. 1, the top coil is adjacent the inner rotor of the machine and the bottom coil is near the outside circumference of the machine. The coils 14 and 16 are supported in an arrangement that includes, in this example, a number of braces 18 extending over the end winding portions of coils 14,16 and brackets 20 that are attached to the braces as well as to the core 10. Other coil support members include a number of rings 17, 19, 21 and 22, and a number of strain blocks 23 between top coils 14 and bottom coils 16.

In this structure, a radial clamp 24 is applied in the mid-involute region between the axial extreme of the end winding and the core 10. The radial clamp is referred to as a radial clamp because it extends in substantially a radial direction in relation to the axis of the machine. A more detailed description of the radial clamp and arrangement of the coil is given in the above identified patent. The clamp 24 essentially includes a band 26 formed of a resin impregnated polyglass material having end loops 28 and 30 passing around pins 32 and 34, respectively. The band 26 passes through diamond shaped apertures between the overlapping and crossing coil end turns 14 and 16. The band 26 creates a tension force between inner support block 36 and outer support block 38 which blocks constrain the coils 14,16. Apertures are formed in blocks 36,38 through which the band passes.

Before turning to a description of the present invention, it is first noted that the coils 14 and 16 exit from the stator slots 12 and are turned or looped in opposite directions proceeding about the cylindrical circumference of the generator. As these coils cross or overlap each other, they create the apparent diamond shaped slots at the crossings. The diamond shaped slots would be visible in a radial view of the end turns. Since coil end turn configurations of generators of this form are well known in the art, no other description is believed necessary.

Figure 2:
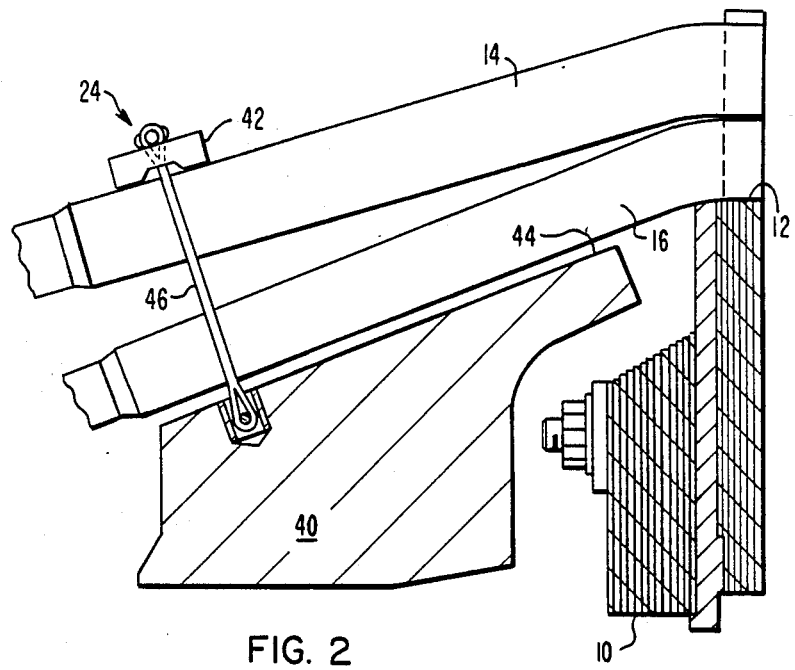
FIG. 2 illustrates a radial clamp assembly in accordance with the present invention.

FIG. 2 is a side view of a stator coil end turn assembly of another form of dynamo electric machine similar to the type illustrated in FIG. 1. This particular construction utilizes a large support cone 40 to provide additional supporting structure for the end turn assembly. It will be noted that the arrangement of FIG. 2 is substantially the same as that of FIG. 1, except for the structural supports for the end turns. Due to the size of the support cone 40, it is difficult to utilize the radial clamping assembly 24 of the prior art since the space available to fasten the ends of the band clamps in position is limited. Accordingly, the present invention is directed towards a system for forming radial band clamps and for installing radial band clamps in generators in which at least one end of the band clamp is not generally accessible. In FIG. 2, the end turns are compressed between an inner annular support ring 42 and the outer annular support cone 40. The ring 42 is formed of a plurality of arcuate segments with each segment having a plurality of apertures through which a one of the radial band clamps 46 passes. The ring 42 is preferably made of a baked fiber glass and epoxy resin material since the electric fields in the area of the end turns are such that metal structures are not permissible. The outer support cone 40 is a continuous or unsegmented conically shaped fiber glass and epoxy ring having an inner annular surface 44 positioned against the outer end turn coils 16. The outer support cone 40 may be secured to the stator core by a plurality of connecting brackets (not shown) which are attached to an outer surface of the support cone away from the electric field adjacent the end turns.

The radial band clamp indicated generally at 46 is formed of the same type of material utilized in the band clamp disclosed in U.S. Pat. No. 4,563,607. In general, this material is a tape material comprising a fiberglass impregnated with a polyester resin. In the method for installing such radial band clamps disclosed in the aforementioned U.S. Pat. No. 4,563,607, a sequence of these band clamps were installed and thereafter cured by directing hot air from heat guns onto the bands after they were installed in place. Initial tension is established on the bands by twisting so that excess length is taken up. The bands require approximately 4 hours at the temperature of 170° C. to cure. The bands may then be tensioned by using a hydraulic jack and stretching the bands while inserting shims under the pins to maintain the bands in their stretched position.

Figure 3:
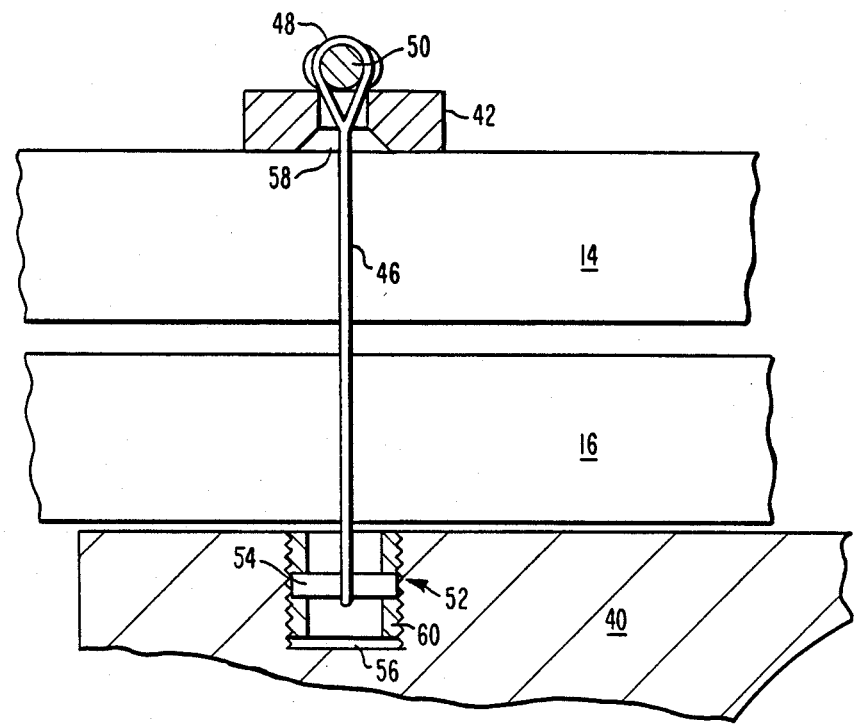
FIG. 3 is an enlarged view of the radial clamp assembly of FIG. 2.

The present invention obviates the requirement for installing and curing radial band clamps in situ while maintaining the advantages of the structure disclosed by the Cooper et al patent. Referring to FIG. 3, there is shown an enlarged sectional view of the radial band clamp assembly 24 of FIG. 2. The radial band 46 is a precured ring band formed of a glass material impregnated with resin which has been precured and stretched to a desired length. A pin 50 is pre-assembled in the top of the band prior to curing. At each end of the band, there is formed an open loop, one of which is indicated at 48 in FIG. 3. The band itself between the end loops may be twisted to form a single cord. At the clamping ring 42, the band can be held in its normal position by passing a pin 50 through the loop 48. At the opposite end of the band 46, the band is connected to an anchor assembly 52 by means of a pin 54 forming part of the assembly 52. The assembly 52 is essentially a cylindrical tube 60 having sufficient wall thickness to accommodate threads. The pin 54 is much like the pin 50 and simply passes through the assembly 52 through the walls of the cylindrical tube. The outer cone 40 is provided with a threaded aperture 56 into which the assembly 52 is fitted. The assembly 52 is sufficiently small that it will fit between phase group openings of the top and bottom coils 14,16 of the generator end turn assembly. Since the band is precured, it is stiff and inflexible and can, therefore, be used to extend the assembly 52 through the phase group openings and into the aperture 56 in the cone 40. The assembly 52 is threaded into the aperture 56. Once firmly seated in place within aperture 56, the outer end of the band assembly is then tensioned and shimed. Tension to a desired level can be achieved with this structure in the same manner as previously described by using a hydraulic jack to pull tension on the band while inserting shims underneath the pin 50. The pin 54, which may be referred to as a wrist pin, is held in position by being trapped within the threaded aperture 56.

Figure 4:
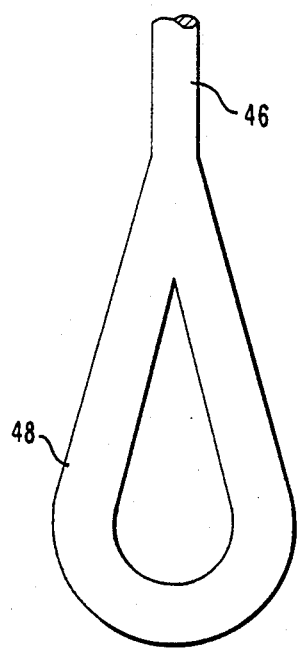
FIG. 4 is a view of a loop formed in a radial band clamp by twisting of the band.

The use of precured and stretched radial bands 46 requires careful orientation of the band end loops so that the tension placed on the end turns by means of the radial band is evenly distributed over the fibers of the end loops. In the prior art system in which the bands were formed in situ, the uncured bands naturally conformed to the shape of the pins in the end loops and the force was distributed over all the fibers of the band. In the precured system, where the bands are cured prior to installation, care has to be exercised in order to assure that the bands or pins are not positioned such that the band load is shifted to only some of the fibers making up the band. FIG. 4 illustrates a typical band arrangement in which a slot is formed at each end of the band by twisting the multiple wraps of tape so as to form loops at each end of the band. Since the tape which is generally used to create the radial bands is approximately 1/2 inch wide, there is some tendency of the tape to distort during the twisting process.

Figure 5:
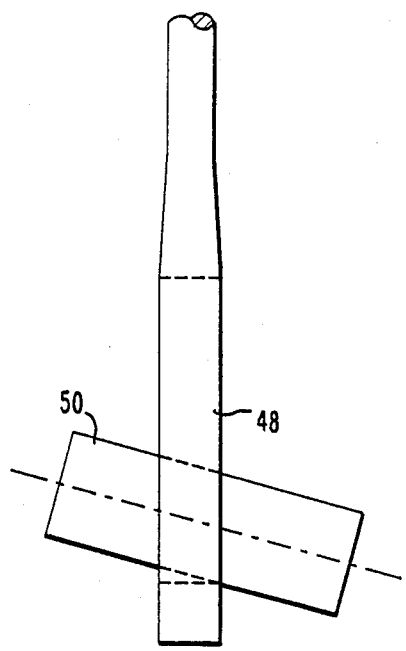
FIG. 5 illustrates a misaligned pin in a loop of the type shown in FIG. 4.
Figure 6A:
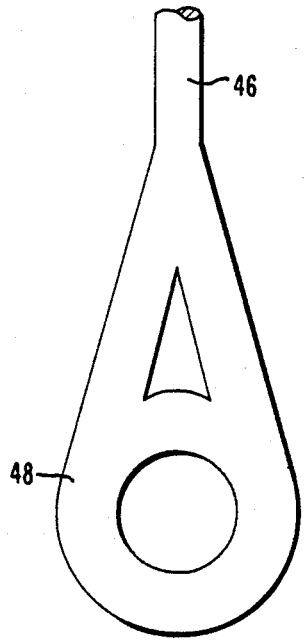
FIGS. 6A and 6B illustrate a pin loop formed using a method in accordance with a teaching of this invention.
Figure 6B:
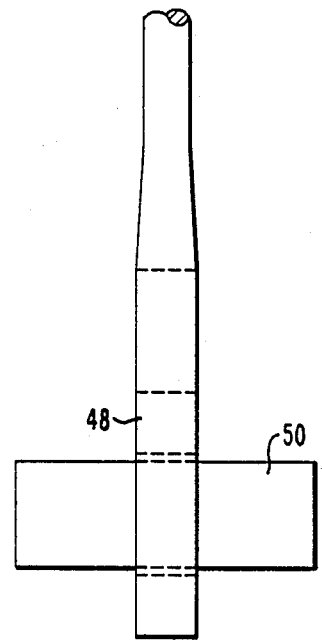

FIG. 5 is a side view showing a pin passing through a slot such that the force exerted on the band at the pin connection is concentrated at one side of the slot through the band. In order to avoid this undesirable configuration, the precured bands are formed on a fixture which contains pins such as those illustrated at 50 and 54. Several layers or turns of the banding tape are then wrapped around the removable fixture pin before making the band with loops of banding tape. After the entire band has been completed, the loop is then twisted and allowed to cure with both pins in place. As shown in FIGS. 6A and 6B, the pin 54 can now be removed so that the hole formed in the band fits tightly about wrist pin 54 so that the force exerted on the band is evenly distributed across all the fibers of the band. The pin 50 used in the fixture to construct the radial bands is preferably the same pin used in the final arrangement so that the pin 50 is not removed during assembly of the radial bands clamps.

Figure 7A:
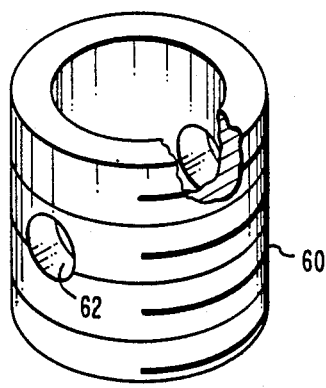
FIGS. 7A, 7B and 7C illustrate one form of anchor assembly for use with a radial band clamp.
Figure 7B:
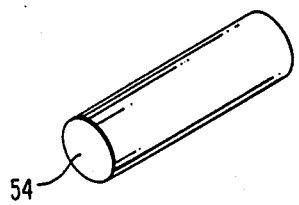

FIGS. 7A and 7B illustrate one form of anchor assembly 52. FIG. 7A shows cylindrical tube 60 formed of a non-magnetic material, e.g., fiberglass, and having diametrically opposite apertures 62 for receiving the wrist pin 54. Pin 54 is shown in FIG. 7B as being essentially a cylindrical pin having a length of approximately the outside diameter of tube 60 and a diameter of a size to fit through apertures 62. An added advantage of this structure is that precise alignment of hole 56 and aperture 58 is not required. The pivotable movement of band 46 about pin 54 allows some slight offset without affecting the utility of the assembly.

Figure 7C:
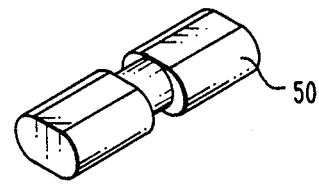

FIG. 7C illustrates one form of the pin 50 in which the pin is provided with a bottom flat side for shimming and to better distribute compressive forces exerted against top ring 42. The top side may also be flat to provide a reduced diameter in one direction to facilitate inserting pin 50 through one of the loops 48 in band 46 if removable pins are required.

The method for forming radial bands in accordance with the present invention comprises wrapping a polyester resin impregnated fiberglass tape or equivalent about a form so as to form an extended loop of material comprising multiple numbers of layers of tape. The loop is then twisted so as to form an extended band having individual smaller loops 48 at opposite ends thereof. The band is then stretched to create a predetermined amount of tension in the band and cured thermally for at least 4 hours at 170° C. to form a precured radial band. In one form, the form on which the tape is wound includes pins of the type for use in attaching the radial band to a generator assembly. In the winding process, at least a first few layers of tape are wound around at least one of the pins so as to form a tightly fitting ring around the pin. Thereafter the tape is wound between the two pins so as to form the radial band. After forming of the radial band, one of the pins is fitted into a cylindrical anchor assembly such as assembly 52 having external threads. In installing the radial band clamps into an electrical generator, the radial band clamp with anchor attached is fed through phase group openings in the end winding assembly of a generator. The end of the precured radial band 46 to be attached to anchor assembly 52 is fed through an aperture in an inner support ring 42 with pin 50 being attached to an opposite end of the band 46. After insertion through the aperture, the anchor assembly 52 is attached to the band end using pin 52. Anchor assembly 52 is then fed into a threaded and mating hole in the outer support cone 40. Thereafter, a hydraulic jack may be utilized to stretch the radial band to a predetermined tension while placing shims under the pin 50 so as to maintain the tension on the radial band after the hydraulic jack is removed.

The method for assembling the ring clamp apparatus may be readily practiced in the field as well as during manufacture. While loosening of the precured radial bands 46 is not contemplated, the inventive apparatus and method of assembly allow for field adjustments in radial band tension and replacement of the end turn support components. Loosening due to creep relaxation is controllable by the spring constant of the precured radial band. Thus, there is provided a novel clamp apparatus which overcomes the limitations of the prior art radial clamping assemblies that require band curing after installation and the use of either spring washers or spring plates to control tension.

While the principles of the invention have been set forth in a particular embodiment, other modifications and arrangements of the present invention will become apparent to those skilled in the art. Accordingly, it is intended that the invention be interpreted within the full spirit and scope of the appended claims.

We claim:

1. A method for clamping top and bottom coils extending from slots in an electric generator stator core and arranged in an overlapping pattern forming a plurality of apertures between adjacent coils, a top ring positionable above the top coils, a ring shaped support cone positioned below the bottom coils, the support cone having an inside annular surface positioned against the bottom coil and including a hole through the inside annular surface, the top ring including at least one aperture aligned with an opening between phase groups, the hole being aligned with the opening, the method comprising the steps of:

forming a resin impregnated radial band;
   twisting the radial band to form loops at each end thereof;
   precuring the radial band under tension;
   coupling one of the loops to an assembly;
   passing the anchor assembly between the coils and into the cone hole;
   securing the anchor assembly within the cone hole;
   aligning a top ring aperture with the cone hole;
   aligning a top ring aperture with the cone hole;
   passing another of the loops of the radial band through the ring aperture; and
   placing a pin through another of the loops to secure the precured radial band.

2. The method of claim 1 further comprising the steps of:

pulling the pin radially inward from the top ring; and
   shimming between the pin and the top ring for stretching the precured radial band.

3. The method of claim 1 wherein the cone hole has internal threads and the anchor assembly has an externally threaded outer cylindrical surface, the step of securing the anchor assembly comprising threading the assembly into the cone hole.

4. The method of claim 3 wherein the step of coupling the one of the loops of the precured radial band to the anchor assembly comprises the steps of passing a wrist pin through the anchor assembly and the one of the loops.

5. The method of claim 3 wherein the step of threading the anchor assembly into the cone hole includes threading the anchor assembly to a selectable depth in the cone hole to vary the effective span of the precured radial band.

6. The method of claim 3 wherein the step of forming the radial band includes the steps of:

wrapping a predetermined number of layers of a resin impregnated fiber glass tape about a pair of spaced pins;
   twisting the wrapped layers of tape to form a band having a loop at each end; and
   curing the twisted band to form the radial band.

* * * * *